United States Patent
Xia et al.

(10) Patent No.: US 7,590,599 B2
(45) Date of Patent: Sep. 15, 2009

(54) SYSTEM AND METHOD OF AUTOMATICALLY MAINTAINING AND RECYCLING SOFTWARE COMPONENTS

(75) Inventors: Chenhong Xia, San Jose, CA (US); Laurence Edward England, Morgan Hill, CA (US)

(73) Assignee: International Business Machines Corporation, Armonk, NY (US)

(*) Notice: Subject to any disclaimer, the term of this patent is extended or adjusted under 35 U.S.C. 154(b) by 175 days.

(21) Appl. No.: 11/615,894

(22) Filed: Dec. 22, 2006

(65) Prior Publication Data

US 2008/0154776 A1   Jun. 26, 2008

(51) Int. Cl.
*H04K 1/00* (2006.01)
*H04L 9/00* (2006.01)

(52) U.S. Cl. .............................. 705/51; 705/52; 726/30
(58) Field of Classification Search ................... 705/51, 705/52; 726/30
See application file for complete search history.

(56) References Cited

U.S. PATENT DOCUMENTS

| | | | | |
|---|---|---|---|---|
| 5,764,972 A | * | 6/1998 | Crouse et al. ................... | 707/1 |
| 5,790,935 A | * | 8/1998 | Payton ......................... | 725/91 |
| 5,812,992 A | | 9/1998 | de Vries | |
| 5,892,900 A | * | 4/1999 | Ginter et al. ................... | 726/26 |
| 5,950,158 A | | 9/1999 | Wang | |
| 5,999,908 A | | 12/1999 | Abelow | |
| 6,298,457 B1 | | 10/2001 | Rachlin et al. | |
| 6,697,948 B1 | * | 2/2004 | Rabin et al. .................... | 726/30 |

OTHER PUBLICATIONS

Wang, Software architecture of the ubiquitous Computing devices, ACM Digital Library/Journal of Northeastern University, Apr. 2004, AN-8098634, Shenyang, China.
Zhang, Pruning Dynamic Slices With Confidence, ACM Digital Library, Jun. 2006, Ottawa, Ontario, Canada.
Jaganathan et al., Increasing Client-Side Confidence in Remote Component Implementations, ACM 2001 1-58113-390-Jan. 1, 2009, Vienna, Austria.
Liu et al., Static Caching for Incremental Computation, ACM Digital Library, May 1998, pp. 546-585, vol. 20, No. 3.

* cited by examiner

*Primary Examiner*—Calvin L Hewitt, II
*Assistant Examiner*—Zeshan Qayyum
(74) *Attorney, Agent, or Firm*—Samuel K. Simpson; Patent Ingenuity, P.C.

(57) ABSTRACT

In one aspect of the disclosure, a computer program product, system and method for maintaining and recycling software components is disclosed. A first set of usage data for one or more software components is recorded. At least one of the plurality of software components is automatically removed if the first set of usage data for the at least one software component meets usage criteria specified in an expiration policy. Access is then provided to the removed software component through a remote server. A second set of usage data is now recorded for the removed software component. The removed software component is automatically re-instated if the second set of usage data meets usage criteria specified in a re-instatement policy.

30 Claims, 6 Drawing Sheets

SYSTEM AND METHOD OF AUTOMATICALLY MAINTAINING AND RECYCLING SOFTWARE COMPONENTS

BACKGROUND

1. Field

The present disclosure generally relates to a method, apparatus, and computer usable code for recycling software components. More particularly, the disclosure relates to automatically retiring software components based on usage level.

2. General Background

Conventional software architectures tend to be planned-ahead and rigid, not flexible and resilient enough to adapt to the fast requirement changes. They are not made to deal with changes other than the pre-determined set of IF-THEN conditions. Software design assumes all variables would have been considered before the system is deployed.

In reality, since changes are not 100% predictable, software must be periodically revised and updated. Therefore, software is often updated with new releases, or patched to cope with changes. A patch is a small piece of software designed to update or fix problems with a computer program. This includes fixing bugs, replacing graphics and improving the usability or performance. Though meant to fix problems, poorly designed patches can sometimes introduce new problems (aka. software regressions).

There are several methods of updating software. Old software can be uninstalled or removed and new software installed in its place. This is time consuming and involves downtime. Alternatively, software can be upgraded, which involves adding onto the already existing framework.

Deployment of new software releases tends to cause system down-time and service interruption. Release cycles also cause stress on the software development process, as shown in the pressure of handling defects near the end of every release, and the leisure of reinventing the wheel in the beginning of a release cycle. Software needs to change more constantly, smoothly, and with less interruption.

Componentization and plug-in framework infrastructures make it possible to update software with on-demand augmentation, such as the software updater on Eclipse and Microsoft Windows automatic update. (Microsoft, Windows, Windows NT, and the Windows logo are trademarks of Microsoft Corporation in the United States, other countries, or both.) Still, a consequence of such augmentation is that the user's system gets larger and larger with time, not only in the sense of software foot print, but also the complexity. We call this problem software obesity.

SUMMARY

In one aspect of the disclosure, a computer program product is disclosed. The computer program product includes a computer useable medium that has a computer readable program. The computer readable program when executed on a computer causes the computer to record a first set of usage data for one or more software components. The computer readable program further is configured to automatically remove at least one of the plurality of software components if the first set of usage data for the at least one software component meets usage criteria specified in an expiration policy. Further, the computer readable program when executed on the computer causes the computer to provide access to the removed software component through a remote server. The computer readable program when executed on the computer further causes the computer to record a second set of usage data for the removed software component. The computer readable program is also configured to re-instate the removed software component if the second set of usage data meets usage criteria specified in a re-instatement policy.

In another aspect of the disclosure, a computer program product is disclosed. The computer program product includes a computer useable medium that has a computer readable program. The computer readable program when executed on a computer causes the computer to record usage data for one or more software components. The computer readable program further is configured to automatically remove at least one of the plurality of software components if the usage data for the at least one software component meets usage criteria specified in an expiration policy. The computer readable program further is configured to provide access to the removed software component through a remote server.

In another aspect of the disclosure, a system for maintaining software components is disclosed. The system comprises a usage data recording module for recording data regarding the usage of a plurality of software components installed within a local environment and storing the data as usage data. The system further comprises a pruning module for comparing the usage data with an expiration policy, and automatically removing at least one of the plurality of software components from the local environment if it is determined that usage of the software component is below a level specified in an expiration policy. The system further comprises a remote access module for relocating the removed component to a location remote from the local environment and providing future access to the removed component.

In yet another aspect of the present disclosure, a method for maintaining software components is disclosed. The method includes recording a first set of usage data for one or more software components. The method further includes automatically removing at least one of the plurality of software components if the usage data for the at least one software component meets usage criteria specified in an expiration policy. The method further provides access to the removed software component through a remote server. The method of maintaining software components further involves recording a second set of usage data for the removed software component. The method further includes re-instating the removed software component if the second set of usage data meets usage criteria specified in a re-instatement policy. In one aspect, usage data comprises a length of time since the last use of the software component. In another aspect, usage data comprises a number of times the software component has been accessed. In yet another aspect, the usage data comprises information regarding utilization of hardware resources by the software component. In one aspect the usage data is stored as metadata.

The expiration policy can be a global expiration policy and applies to all or a group of the plurality of software components. Alternatively, the expiration policy is an individual expiration policy and applies to an individual software component. In one aspect, the expiration policy is set by a user.

In one aspect, the usage criteria specified in the expiration policy is a length of time, and the usage data meets the usage criteria if the length of time since the last use of the software component is greater than the length of time in the usage criteria. In another aspect, the usage criteria specified in the expiration policy is a number, and the usage data meets usage criteria if the number of times the software component has been accessed is less than the number in the usage criteria.

In one aspect, removing the software component comprises un-installing the software component. In one aspect, access to the removed software component is provided through a remotely run web service running on a web server.

In one aspect, re-instating the removed software component comprises re-installing the software component.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

An automated approach to maintaining software components based on usage can be implemented. Since a user's software system can not be placed on a "diet" due to increasing functional demands, the solution is to actively prune or archive components based on demand and usage. Software systems can change gradually by adding or replacing components, and pruning unwanted ones, depending on the change of requirements.

Figure 1:
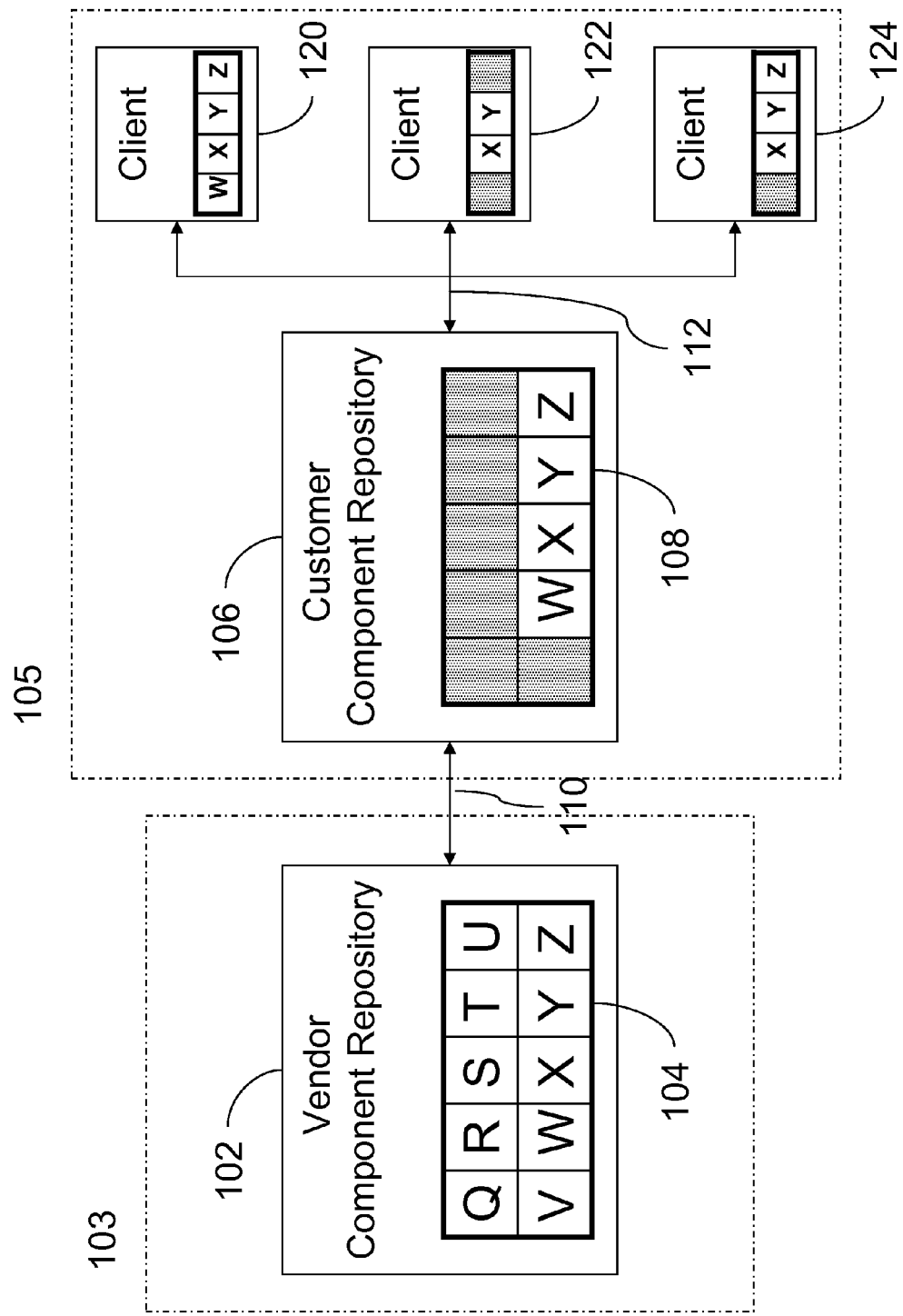
FIG. 1 illustrates a block diagram of a system including a vendor component repository and a customer component repository, as well as a plurality of clients, in which maintenance of software components based on usage can be implemented.

FIG. 1 illustrates a block diagram of a system in which automatically maintaining and recycling components in accordance with one aspect of the present disclosure may be implemented. A vendor component repository 102 stores a plurality of software components 104 that can plug/play into a known infrastructure, preferably an industrial standard infrastructure (e.g., Windows, Eclipse, NET, etc.). The vendor 103 is, for example, a software company or provider which works to produce new software components and update existing ones with time. In this example, the vendor 103 maintains a software component repository 102 containing software components Q through Z, as are illustrated in the cells within block 104.

A customer 105 utilizes software components produced by the vendor 103. For example, customer 105 may be a company which sells products and uses the vendor's software to facilitate selling their products. The customer 105 similarly maintains its own software component repository, customer component repository 106. The customer 105 can select the components it needs from the vendor's repository 102 and store them in it's own company component repository 106. The customer's software components are indicated by the cells within block 108. In this example, the customer selects only components W, X, Y, and Z from the vendor's repository 102. The vendor component repository 102 is preferably accessed by the customer component repository 104 through a network connection 110, or the Internet.

In one aspect, as the vendor 103 updates components 104 within its vendor component repository 102, corresponding software components 108 are updated within the customer component repository 106. For example, consider component Y is updated by the vendor to address a performance issue. Updated component Y is stored in the vendor's repository 102, and component Y in the customer's repository 108 is automatically updated to reflect the changes made. This can be accomplished by downloading the newly updated component through an Internet connection 110 between customer component repository 102 and vendor component repository 106.

Furthermore, each customer may comprise a plurality of clients which utilize various software components from the software component repository. Each individual client system in the company can download desired components to the infrastructure that can host the components, e.g., download a plug-in to Eclipse or a Windows component. For example, three clients 120, 122, and 124 are illustrated in FIG. 1, each utilizing a different set of software components. Client 120 has selected and installed components W, X, Y, and Z from the software component repository. Client 122 has selected components X and Y. Client 124 has selected components X, Y, and Z. In this example, clients 120, 122, and 124 may be individual desktops of laptop computers used by employees of the company.

In another embodiment, the clients (120, 122, 124) can retrieve software components directly from the vendor component repository 102, eliminating the need for an intermediary customer component repository 106. For example, a client may be a personal home computer, and directly download and install software components from a plurality of various software component repositories accessed through an Internet connection. Clients may be any computing device, including, but not limited to desktop/laptop computers, cell phones, handheld devices or PDA's, set top boxes, server, etc.

With time, the company's repository and client systems will grow and become larger and larger. The growth will add overhead to footprint and component management. How can the system clean itself and remove less-used components? In other words, what is the pruning mechanism to prevent system obesity? The solution proposed by the present disclosure involves automatically retiring existing software components if they are determined to be less in demand, based on the usage level and/or usage pattern.

In one embodiment, this is accomplished through a simple mechanism such as associating an expiration policy with one or more software components. For example, a software component that has not been used for a long time can be set to automatically retire. Therefore, the expiration policy can specify a length of time the component can go without use before being retired. As another example, a software component that has been called or used only a few times can be set to automatically retire. In this case, the expiration policy may specify a number of times the component is accessed, below which the software component should be retired.

Figure 2:
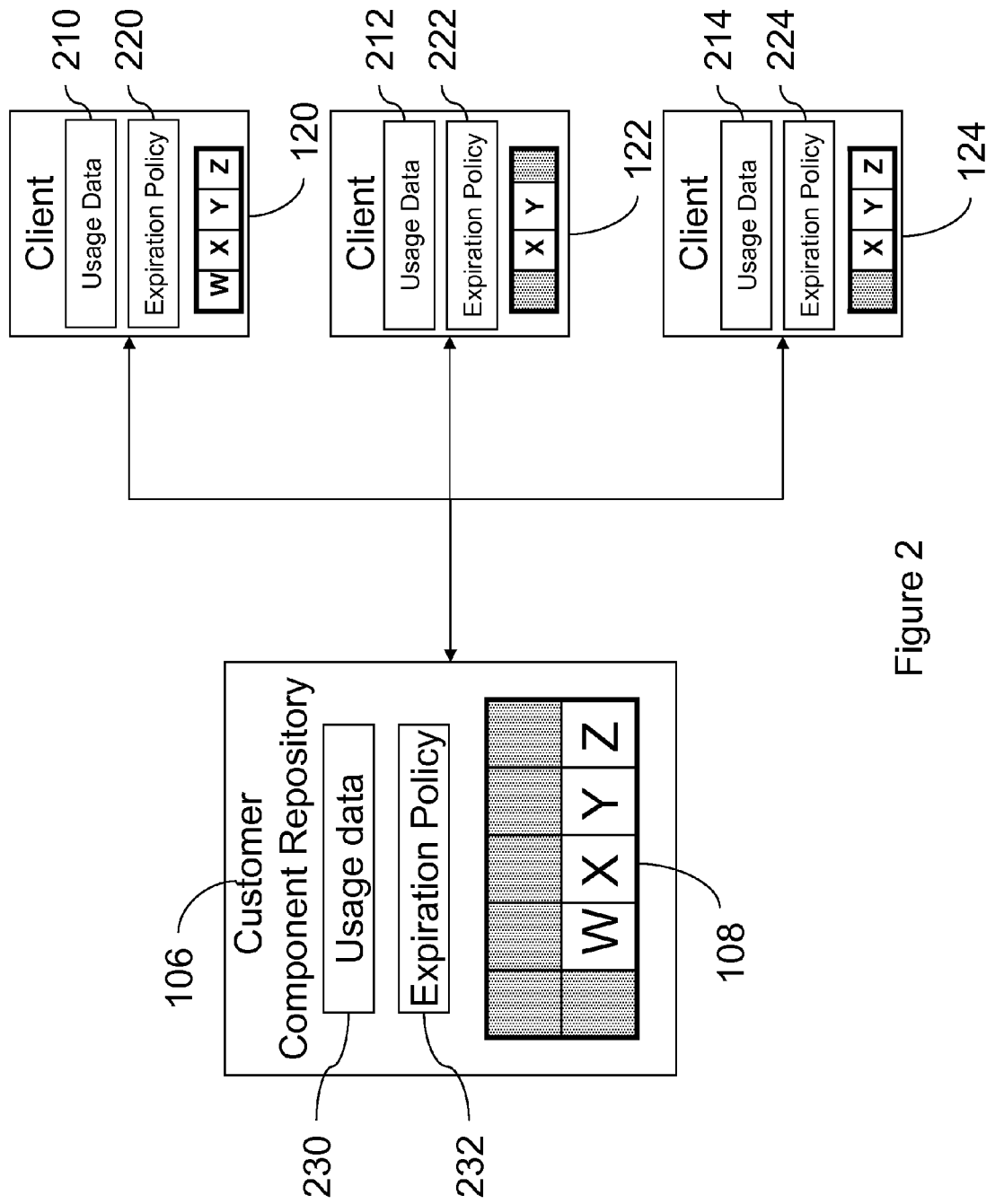
FIG. 2 is a configuration in which automated maintenance of software components based on usage is utilized by a customer component repository and a plurality of clients.

Several examples of a system and method for automatically maintaining software components based on usage are explained with reference to FIG. 2. As mentioned above with reference to FIG. 1, for exemplary purposes, three clients 120, 122, and 124 are illustrated, each client having downloaded and installed various components 108 from the customer component repository 106.

In order to implement such a system and method of automatically maintaining software components based on usage, usage data regarding each of the software components is recorded. For example, a process running on the client monitors the use of the software components installed on the client and data regarding the usage of each software component as usage data. In this example, clients 120, 122, and 124 record usage data as indicated at blocks 210, 212, and 214, respectively. In one aspect, the usage data is stored as metadata. The usage data as indicated at 210, 212, and 214 may be stored as a single file, or a plurality of files, and the data file can be of any type.

Usage can be measured in a number of ways. Usage could be recorded as a length of time since the software component was last used. Therefore, software components that have not been used for a long period of time could be set to retire, according to an expiration policy. Usage could simply be measured by the number of times the software component was called or accessed. Usage could also be measured by the number of clients or users which access the software component. For example, a software component could be used by only one person many times, or by many different people, but accessed infrequently. Alternatively, usage could be measured by the hardware resources utilized by a software component, such as memory usage, hard disk space, processor usage, or bandwidth usage.

As mentioned above, an expiration policy is specified. The expiration policy contains rules or criteria regarding the usage level, above or below which a software component can be set to retire. In FIG. 2, clients 210, 212, and 214 each have their own expiration policies 220, 222, and 224 respectively. In one embodiment, the expiration policy may specify that if a software component has not been used for a predetermined period of time (e.g. number of days), it should be retired. In another embodiment, the expiration policy could specify that usage below a certain level results in the software component being retired. The expiration policy may use a combination of different measures of usage to determine if a software component should be retired. For example, the expiration policy might specify a combination of length of time since last use, and the number of times the accessed.

The expiration policy can be a global expiration policy, an individual expiration policy, or a combination of both. For example, a global expiration policy could apply to all or a group of software components. An individual expiration policy could also be set to apply to individual software components. A combination of both a global expiration policy and an individual expiration policy may also be used. For example, a global expiration policy might apply to all software components, except for those components where an individual expiration policy is specified, in which case the individual expiration policy takes precedent. The expiration policy can be set by the vendor, the customer, the client, or by the user. Therefore, in one aspect, each client user can set his or her own preferences as to when software components should be automatically set to retire. For example, one user may want software components to automatically retire with no use after months, while another user may prefer to set the time limit to weeks.

In addition to an expiration policy, other types of policies can be set which govern the retirement of components. For example an individual expiration policy could specify that a core infrastructure component will never expire, regardless of how rarely it is used.

In one aspect, each client records its own usage data and sets its own expiration policies. For example, client 120 has downloaded and installed software components W, X, Y, and Z from the software component repository 106. Client 120 is configured to monitor the software components installed on its system and record usage data 210 related to the usage of each of its installed software components. Furthermore, client 120 is configured with an expiration policy 220 regarding the installed software components. The expiration policy may be initially set as a generic expiration policy, and later be revised by the user according to his or her preferences. Consider an example of usage data 210 as recorded by client 120 indicates the following:

| Software Component | Time since last use | Number of times called, last month | Average Processor Use |
|---|---|---|---|
| W | 1 day, 3 hrs | 12 | n/a |
| X | 93 days | 0 | n/a |
| Y | 2 hours | 53 | High |
| Z | 2 days, 4 hrs. | 5 | Low |

The usage data indicates that software component X was last used more than three months ago, while the other software components were recently used. An expiration policy could therefore be set to automatically expire component X.

In another aspect, the software component repository itself can maintain and recycle its own software components in a similar way as each of the clients. Therefore, in one aspect, customer component repository records its own usage data 230 and has its own expiration policy 232. For example, the usage data 220, 222, and 224 collected by each of the plurality of clients can be collected by the customer repository and analyzed as a whole. Consider for example, that usage data 230 indicated that a particular component, component W, has not been used in a while by the group as a whole (clients 120, 122, and 124, collectively). For example, in FIG. 2, component W is only utilized by client 120, and not by clients 122 and 124. Therefore it may be determined that the software component should be retired from the software component repository altogether. The customer component repository 106 could collect the usage data from the plurality of clients (in this example, clients 120, 122, and 144) and determine that component W is not used enough to justify keeping it in the repository.

Even further, the usage data can be transmitted back to the vendor.

In one aspect, the act of retiring a software component involves removing or uninstalling the component. However, because there is no guarantee that a retired component will never be called again, it is preferable that access to the component still be provided. Therefore, in one embodiment, the component is wrapped as a web service and is made accessible from a remote location such as an intranet server. In an unlikely event the retired service is called again by a client, the component just runs remotely as a web service, with slower performance.

Figure 3:
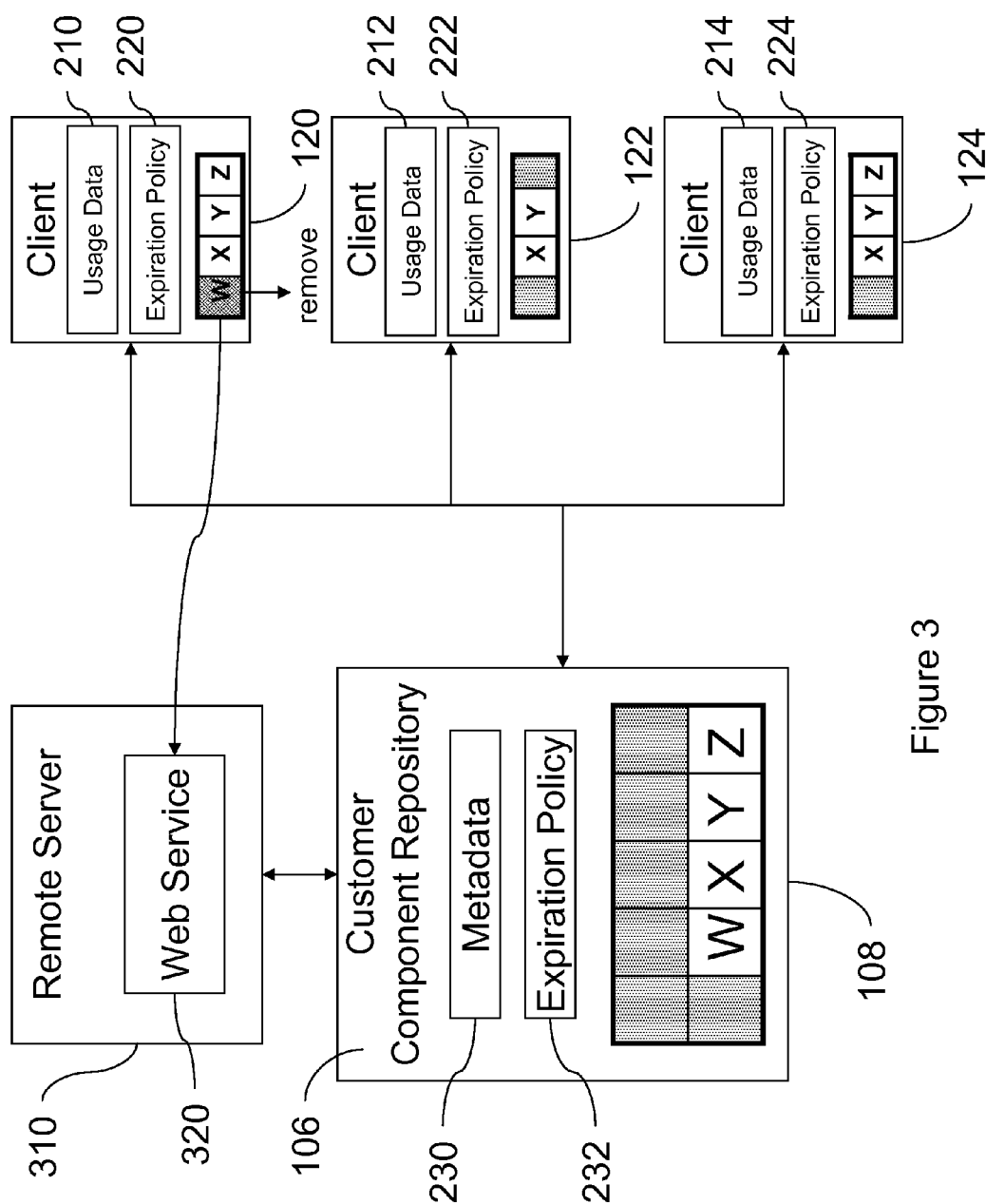
FIG. 3 is a configuration in which automated maintenance of software components based on usage is implemented by providing remote access to retired software components.

FIG. 3 illustrates how access can still be provided to retired components through use of a remote server 310. In one aspect access is provided through a web server. The remote server 310 may for example run on a local area network associated with the customer and/or clients. Alternatively, the remote server 310 may be located outside the local area network, but still accessible through the Internet. For example, the vendor may provide remote access to the software components through a remote server 310.

Generally, a component has an interface or application programming interface (API) that demonstrates its behavior. Other components can call this component using its interface without knowing the detailed implementation of this component. The interface can be used by a web service wrapper to wrap the component into a Web Service. For example, an Extensible Markup Language (XML) based protocol such as Simple Object Access Protocol (SOAP) can be used to provide access to components through HyperText Transfer Protocol (HTTP). SOAP provides a way to communicate between applications running on different operating systems, with different technologies and programming languages. Therefore, a web service wrapper places a SOAP envelop around the interface to transform the request/response to/from the component into XML messages.

Alternatively, a Web Service Definition can be produced in WSDL (Web Service Definition Language) which can be used to generate a proxy client which invokes the service/component. Various transport protocols are supported by Web Services with http being the most popular. Other technologies can of course be used to convert components such as a database stored procedure into a web service. Alternate methods of invocation beyond Web Service invocation include Remote Procedure Call (RPC) or CORBA component model invocations.

A more complex mechanism can also be used to determine when software components should be retired. One more complex mechanism involves recording a component's usage history dynamically in its usage data, and using the usage history to calculate statistical patterns. For example, a software component named DISCOUNT may tend to be used heavily right after Christmas, and the end of each quarter. However, the rest of the year it is rarely called. The system uses this historical-pattern statistics to dynamically move the component in and out of the system. When the discount season is over, the software component is retired and put on reserve as a Web Service on a server. The metadata can be located in either the local system or a remote repository, or both. When the discount season approaches again, the software component can be brought back to the local environment and reinstalled. The same mechanisms can be used to prune shared components in the company's component repository.

These mechanisms guarantee that a software system "remembers" its components' usage history, and can recall backward versions of components on demand. Therefore, backward compatibility can be resolved. Calling components on reserve will cost extra time and impact system performance, but it will reduce system breakage, and prevent many "Null Pointer" errors.

The history metadata can also be pruned using the same mechanisms mentioned above, which requires the creation of another layer of metadata for the history metadata. This cycle of creating metadata layers promotes the scalabilty of the above mentioned mechanisms; however, in reality, extra layers of metadata will inevitably slow down system performance.

Another aspect of the system and method of automatically maintaining software components is the ability to re-instate software components that have previously been retired. For example, once a component has been retired from use, if the usage is frequent or heavy enough (depends on user's policy), then the component should be brought back, or reinstalled. A software system can therefore adapt to its usage environment through a concept of recycling software components—putting them in storage when they are not being used often enough, and retrieving them from storage when they become useful again.

For example, a retired component which was made remotely accessible through a web service can be converted back to the "native" component—just the reverse process of the above mentioned web service wrapping process of components. This does not mean the web service will be deleted. Both representations of the component can exist in different places—as a remote web service or as a native component locally. It is up to user's policy whether to keep both representations.

This may be particularly advantageous for smaller portable computer devices. Only frequently used components will stay local, extra ones not used often get pushed remotely. This way, a wireless device, can be small and light, but also powerful. Also different users' devices can behave quite differently based on the users' usage patterns.

Figure 4:
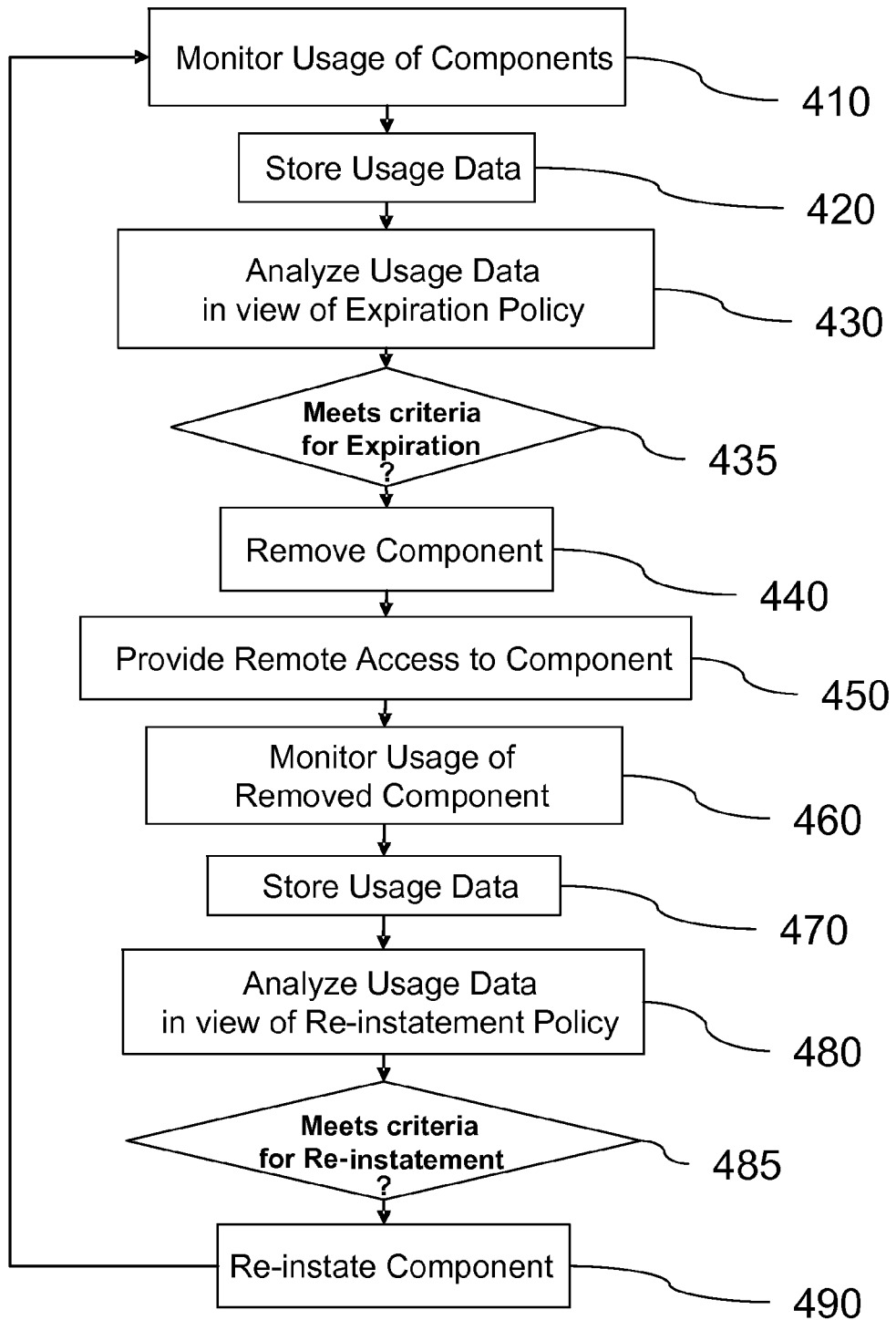
FIG. 4 is a flow diagram of a process for maintaining software components in accordance with the present disclosure.

FIG. 4 is a flow diagram illustrating the basic steps involved in automatically maintaining software components based on usage.

The usage of a plurality of software components installed on a system is monitored, and data regarding the usage of each of the software components is recorded. The step of monitoring usage of various software components within a system is indicated at block 410. The usage data is then stored, as is indicated at block 420. In one aspect, the usage data is stored as metadata and associated with one or more software components. The usage data is then analyzed in view of an expiration policy, as indicated at step 430. The expiration policy may be a global expiration policy applying to all or a group of software components, or an individual expiration policy applying to individual software components. Usage data for each individual component is compared with the applicable expiration policy applying to that component. This may involve comparing more than one expiration policy, e.g. a global and an individual expiration policy. A determination regarding whether or not the criteria specified in the one or more expiration policies is met by the usage data at block 435. If it is determined that the criteria specified within the expiration policy has been met, then the component is retired, as shown at block 440. In one aspect, retiring a component involves removing or uninstalling the component from the system. In order to provide continued access to the component in the case it is called again, the component is then made available through some other resource. For example, in one aspect, the component is moved to a remote location such as a web server, and access is provided through a web service. The step of providing remote access to the component after being retired is indicated at block 450.

However, usage of the retired component can still be monitored, and the software component can potentially be re-instated if usage of the retired component warrants. Therefore, the usage of the retired component via remote access is monitored (460) and usage data related to the retired component is stored (470). A re-instatement policy is used to determine if the usage warrants re-instatement of the retired component. The re-instatement policy is similar to the expiration policy. Therefore, the usage data is analyzed in view of the re-instatement policy (480), and if the usage data meets the criteria specified in the re-instatement policy, then the retired component can be re-instated, as indicated at block 490. In one aspect, re-instatement involves re-installing the software component on the local environment. Once a component has been re-instated, the cycle starts again.

Figure 5:
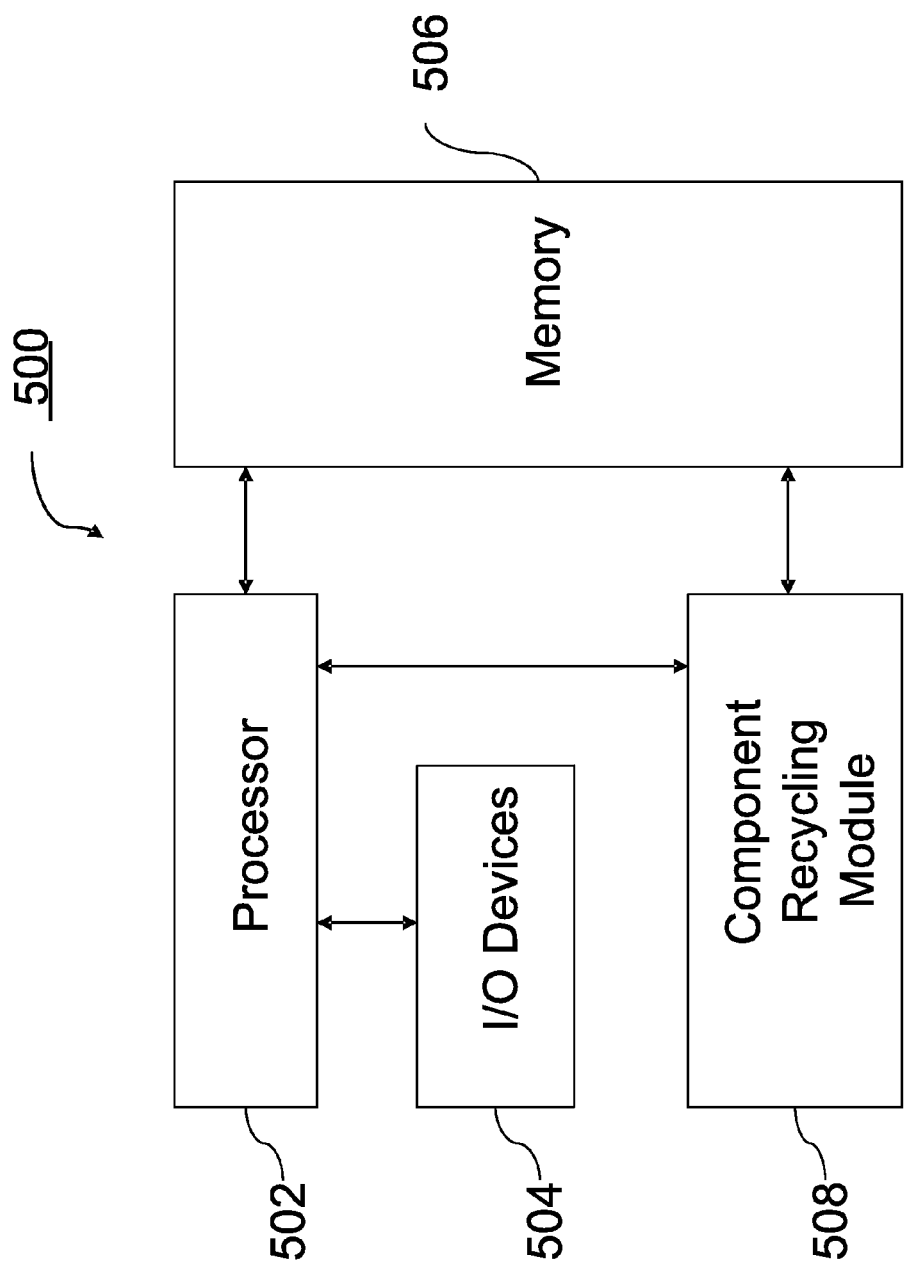
FIG. 5 is a block diagram of a system that utilizes automatic maintenance of software components based on usage as implemented in hardware.

FIG. 5 illustrates a block diagram of a system 500 that automatically maintains and recycles software components based on usage. In one embodiment, the system 500 is suitable for storing and/or executing program code and is implemented using a general purpose computer or any other hardware equivalents. Thus, the system 500 comprises a processor 502, a memory 606, e.g., random access memory ("RAM") and/or read only memory ("ROM"), a component recycling module 508, and various I/O devices 504.

The processor 502 is coupled, either directly or indirectly, to the memory 506 through a system bus. The memory 506 can include local memory employed during actual execution of the program code, bulk storage, and/or cache memories which provide temporary storage of at least some program code in order to reduce the number of times code must be retrieved from bulk storage during execution.

The I/O devices 504 can be coupled directly to the system 500 or through intervening input/output controllers. Further, the I/O devices 504 can include a keyboard, a keypad, a mouse, a microphone for capturing speech commands, a pointing device, and other user input devices that will be recognized by one of ordinary skill in the art. Further, the I/O devices 504 can include a receiver, transmitter, speaker, display, image capture sensor, biometric sensor, etc. In addition, the I/O devices 504 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include, but is not limited to, firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

Figure 6:
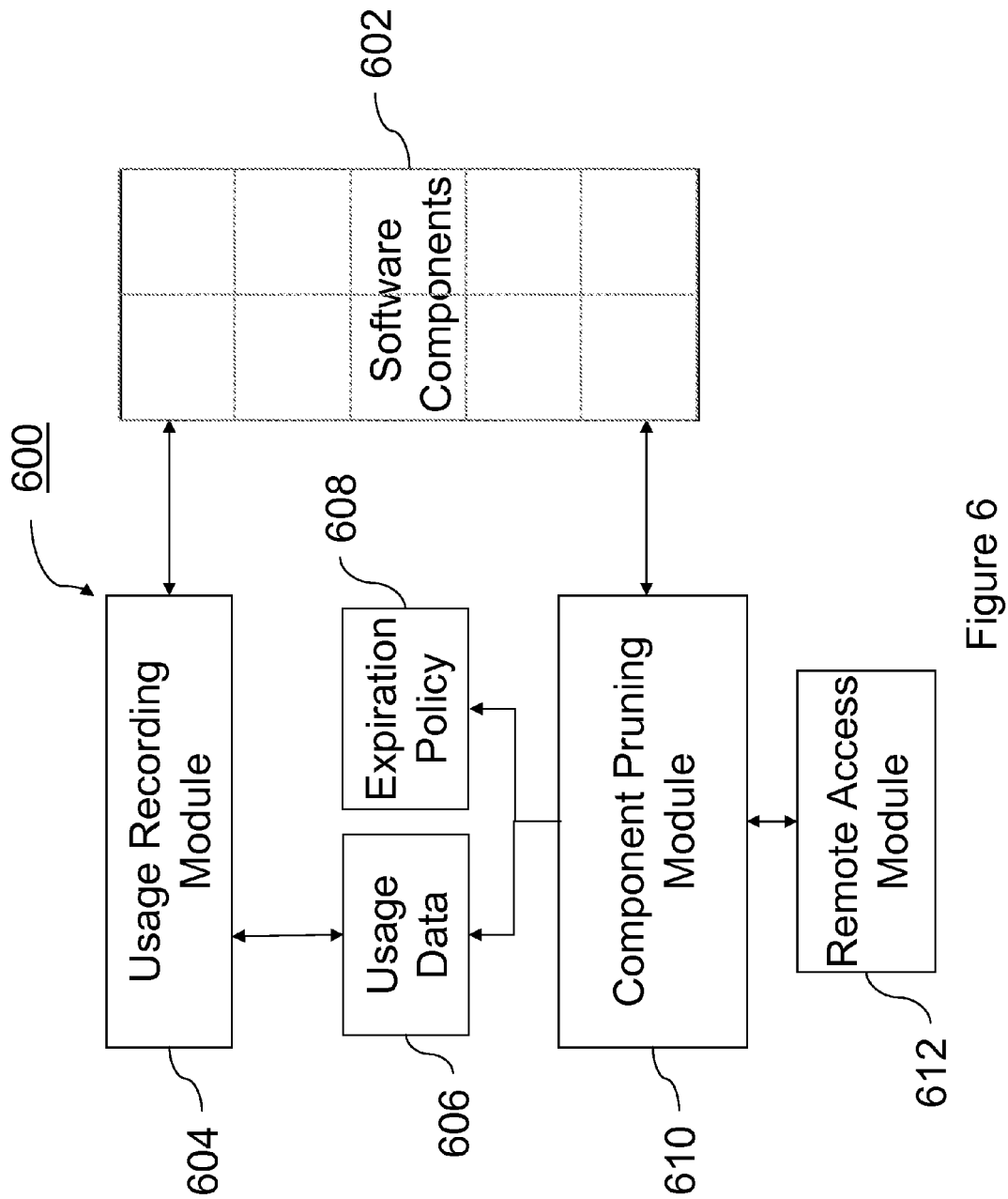
FIG. 6 is a functional block diagram of a system for automatically maintaining software components based on usage within a local environment.

FIG. 6 illustrates the component recycling module 508 of FIG. 5 in more detail. A plurality of software components 602 exist within a local environment. The software components may, for example, be installed on one of client computers 120, 122, or 124 as illustrated in previous figures. Alternatively, the software components could be the software components found in a customer component repository 106. A usage recording module 604 is capable of monitoring the usage of the plurality of software components 602. As described above, usage can be monitored using a number of measures including, but not limited to, the number of times a component is called, the number of users accessing the component, the length of time since the component was last used, and resource consumption such as disk space, memory, processor utilization, etc. Usage data 606 regarding each of the software components is then stored. An expiration policy 608 is also stored. A component pruning module 610 accesses the usage data 606 and expiration policy 608 to determine if the usage of a software component meets the criteria specified in the expiration policy. This may be done by a simple comparison, such as whether the usage level is above or below the value specified in the expiration policy. Alternatively, in the case of usage patterns, this may involve more complicated statistical analysis as has been described above. If it has been determined that the usage data for a software component meets criteria specified in the expiration policy, the component pruning module retires the component. This can be accomplished by removing or uninstalling the software component from the environment. In one aspect of the disclosure, a remote access wrapper is employed to provide future access to the retired component from a remote location.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method for maintaining software components comprising:
    storing one or more of a plurality of software components on a computer;
    recording a first set of usage data for the one or more of a plurality of software components;
    automatically removing at least one of the plurality of software components from the computer based on the first set of usage data of the at least one software component meeting usage criteria specified in an expiration policy;
    transmitting the removed software component to a remote server;
    providing access to the removed software component through the remote server;
    recording a second set of usage data for the removed software component; and
    automatically reinstalling the removed software component on the computer based on the second set of usage data meeting usage criteria specified in a re-instatement policy.

2. The method for maintaining software components of claim 1 wherein the usage data comprises a length of time since a last use of the software component.

3. The method for maintaining software components of claim 1 wherein the usage data comprises a number of times the software component has been accessed.

4. The method for maintaining software components of claim 1 wherein the usage data comprises information regarding utilization of hardware resources by the software component.

5. The method for maintaining software components of claim 1 wherein the expiration policy is a global expiration policy and applies to all or a group of the plurality of software components.

6. The method for maintaining software components of claim 1 wherein the expiration policy is an individual expiration policy and applies to an individual software component.

7. The method for maintaining software components of claim 1 wherein the expiration policy is set by a user of the software components.

8. The method for maintaining software components of claim 1 wherein the usage criteria specified in the expiration policy is a length of time, and the usage data meets the usage criteria if a length of time since the last use of the software component is greater than the length of time in the usage criteria.

9. The method for maintaining software components of claim 1 wherein the usage criteria specified in the expiration policy is a number, and the usage data meets usage criteria if a number of times the software component has been accessed is less than the number in the usage criteria.

10. The method for maintaining software components of claim 1 wherein access to the removed software component is provided through a remotely run web service.

11. A computer program product comprising a computer useable medium having a computer readable program, wherein the computer readable program when executed on a computer causes the computer to:
    store one or more of a plurality of software components on a computer;
    record a first set of usage data for the one or more of a plurality of software components;
    automatically remove at least one of the plurality of software components from the computer based on the first set of usage data of the at least one software component meeting usage criteria specified in an expiration policy;
    transmit the removed software component to a remote server;
    provide access to the removed software component through the remote server;
    record a second set of usage data for the removed software component; and
    automatically reinstall the removed software component on the computer based on the second set of usage data meeting usage criteria specified in a re-instatement policy.

12. The computer program product of claim 11 wherein the usage data comprises a length of time since a last use of the software component.

13. The computer program product of claim 11 wherein the usage data comprises a number of times the software component has been accessed.

14. The computer program product of claim 11 wherein the usage data comprises information regarding utilization of hardware resources by the software component.

15. The computer program product of claim 11 wherein the expiration policy is a global expiration policy and applies to all or a group of the plurality of software components.

16. The computer program product of claim 11 wherein the expiration policy is an individual expiration policy and applies to an individual software component.

17. The computer program product for maintaining software components of claim 11 wherein the expiration policy is set by a user of the software components.

18. The computer program product of claim 11 wherein the usage criteria specified in the expiration policy is a length of time, and the usage data meets the usage criteria if a length of time since the last use of the software component is greater than the length of time in the usage criteria.

19. The computer program product of claim 11 wherein the usage criteria specified in the expiration policy is a number, and the usage data meets usage criteria if a number of times the software component has been accessed is less than the number in the usage criteria.

20. The computer program product of claim 11 wherein access to the removed software component is provided through a remotely run web service.

21. A system for maintaining software components comprising: a computer for storing one or more of a plurality of software components, recording a first set of usage data for the one or more of a plurality of software components, automatically removing at least one of the plurality of software components based on the first set of usage data of the at least one software component meeting usage criteria specified in an expiration policy, providing access to the removed software component through a remote server, recording a second set of usage data for the removed software component, and automatically reinstalling the removed software component based on the second set of usage data meeting usage criteria specified in a re-instatement policy; and a transmitter for transmitting the removed software component to the remote server.

22. The system of claim 21 wherein the usage data comprises a length of time since a last use of the software component.

23. The system of claim 21 wherein the usage data comprises a number of times the software component has been accessed.

24. The system of claim 21 wherein the usage data comprises information regarding utilization of hardware resources by the software component.

25. The system of claim 21 wherein the expiration policy is a global expiration policy and applies to all or a group of the plurality of software components.

26. The system of claim 21 wherein the expiration policy is an individual expiration policy and applies to an individual software component.

27. The system of claim 21 wherein the expiration policy is set by a user of the software components.

28. The system of claim 21 wherein the usage criteria specified in the expiration policy is a length of time, and the usage data meets the usage criteria if a length of time since the last use of the software component is greater than the length of time in the usage criteria.

29. The system of claim 21 wherein the usage criteria specified in the expiration policy is a number, and the usage data meets usage criteria if a number of times the software component has been accessed is less than the number in the usage criteria.

30. The system of claim 21 wherein access to the removed software component is provided through a remotely run web service.

* * * * *